United States Patent
Yang et al.

(10) Patent No.: US 8,255,107 B2
(45) Date of Patent: Aug. 28, 2012

(54) TRAVELING CONTROL METHOD, MEDIUM, AND APPARATUS FOR AUTONOMOUS NAVIGATION

(75) Inventors: Gyunghye Yang, Seoul (KR); Yonggook Park, Seoul (KR); Hyunjin Kim, Gwangju-si (KR); Seokwon Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/662,587

(22) Filed: Apr. 23, 2010

(65) Prior Publication Data

US 2010/0211243 A1    Aug. 19, 2010

Related U.S. Application Data

(62) Division of application No. 11/072,435, filed on Mar. 7, 2005, now Pat. No. 7,734,385.

(30) Foreign Application Priority Data

Mar. 5, 2004    (KR) .................... 10-2004-0015151

(51) Int. Cl.
*G01C 22/00* (2006.01)
*G05F 1/00* (2006.01)

(52) U.S. Cl. ........ 701/23; 701/32.3; 701/32.4; 701/412; 701/468; 700/245; 700/247; 318/568.12

(58) Field of Classification Search .................... 701/23, 701/301, 207, 224, 412, 46, 8, 410–411; 700/245, 247; 180/167; 340/435, 436; 15/340.1, 15/319, 339; 318/568.1, 568.12
See application file for complete search history.

(56) References Cited

U.S. PATENT DOCUMENTS

| | | |
|---|---|---|
| 5,563,786 A | 10/1996 | Torii |
| 5,610,815 A | 3/1997 | Gudat et al. |
| 5,615,116 A | 3/1997 | Gudat et al. |
| 5,648,901 A | 7/1997 | Gudat et al. |
| 5,657,226 A | 8/1997 | Shin et al. |
| 5,808,374 A | 9/1998 | Miller et al. |

(Continued)

FOREIGN PATENT DOCUMENTS

GB    9827754    * 12/1998

(Continued)

OTHER PUBLICATIONS

Yagi et al.., Map-based navigation for a mobile robot with omnidirectional image sensor COPIS, 1995, IEEE, p. 634-648.* Yagi et al., Estimating location and avoiding collision against unknown obstacles for the mobile robot usign omnidirectional image sensor COPIS, 1991, IEEE, p. 909-914.*

(Continued)

*Primary Examiner* — Cuong H Nguyen
(74) *Attorney, Agent, or Firm* — Staas & Halsey LLP

(57) ABSTRACT

A traveling control method, medium, and apparatus for autonomous navigation. The traveling control method of controlling an autonomous navigation machine, having at least on the right and left sides thereof at least first and second receivers that receive a radio signal transmitted from a transmitter disposed at a specific position in a traveling area, the method includes allowing at least one of the first and second receivers to receive the radio signal, recognizing a command included in the received radio signal, acquiring data indicating a size of a recognizable area reached by the radio signal and a position of the transmitter while the autonomous navigation machine moves along the border of the recognizable area, and executing the recognized command in the recognizable area.

21 Claims, 7 Drawing Sheets

U.S. PATENT DOCUMENTS

| | | | |
|---|---|---|---|
| 5,938,704 A * | 8/1999 | Torii | 701/23 |
| 6,490,539 B1 | 12/2002 | Dickson et al. | |
| 7,079,923 B2 * | 7/2006 | Abramson et al. | 700/245 |
| 7,167,775 B2 * | 1/2007 | Abramson et al. | 700/245 |
| 7,211,980 B1 | 5/2007 | Bruemmer et al. | |
| 7,248,951 B2 * | 7/2007 | Hulden | 701/23 |
| 7,274,332 B1 * | 9/2007 | Dupray | 342/450 |
| 7,298,327 B2 * | 11/2007 | Dupray et al. | 342/451 |
| 7,299,056 B2 | 11/2007 | Anderson | |
| 7,299,057 B2 | 11/2007 | Anderson | |
| 7,313,404 B2 | 12/2007 | Anderson | |
| 7,499,774 B2 | 3/2009 | Barrett et al. | |
| 7,499,775 B2 | 3/2009 | Filippov et al. | |
| 7,499,776 B2 | 3/2009 | Allard et al. | |
| 7,499,804 B2 | 3/2009 | Svendsen et al. | |
| 7,525,484 B2 * | 4/2009 | Dupray et al. | 342/450 |
| 7,587,260 B2 | 9/2009 | Bruemmer et al. | |
| 7,610,122 B2 | 10/2009 | Anderson | |
| 7,620,477 B2 | 11/2009 | Bruemmer | |
| 7,729,803 B2 * | 6/2010 | Lim et al. | 700/245 |
| 2001/0022558 A1 * | 9/2001 | Karr et al. | 342/450 |
| 2002/0120364 A1 * | 8/2002 | Colens | 700/262 |
| 2002/0124343 A1 * | 9/2002 | Reed | 15/319 |
| 2002/0174506 A1 * | 11/2002 | Wallach et al. | 15/319 |
| 2003/0120389 A1 * | 6/2003 | Abramson et al. | 700/245 |
| 2003/0146871 A1 * | 8/2003 | Karr et al. | 342/457 |
| 2003/0222820 A1 * | 12/2003 | Karr et al. | 342/457 |
| 2003/0229421 A1 * | 12/2003 | Chmura et al. | 700/245 |
| 2004/0093122 A1 * | 5/2004 | Galibraith | 700/245 |
| 2009/0082879 A1 * | 3/2009 | Dooley et al. | 700/3 |
| 2010/0211243 A1 * | 8/2010 | Yang et al. | 701/23 |

FOREIGN PATENT DOCUMENTS

| | | |
|---|---|---|
| IL | 145680 * | 9/2001 |
| JP | 6-002940 | 1/1994 |
| JP | 6-012380 | 2/1994 |
| JP | 06-187032 | 7/1994 |
| JP | 7-288883 | 11/1995 |
| KR | 10-2005-0080977 * | 8/2005 |
| WO | WO00/36962 * | 6/2000 |

OTHER PUBLICATIONS

Ambiguity resolving in structured light 2D range finder for SLAM operation for home robot applications; Myung-Jin Jung; Hyun Myung; Hyoung-Ki Lee; SeokWon Bang; Advanced Robotics and its Social Impacts, 2005. IEEE Workshop on Digital Object Identifier: 10.1109/ARSO.2005.1511613; Publication Year: 2005, pp. 18-23.*

CV-SLAM: a new ceiling vision-based SLAM technique; WooYeon Jeong; Kyoung Mu Lee; Intelligent Robots and Systems, 2005. (IROS 2005). 2005 IEEE/RSJ International Conference on; Digital Object Identifier: 10.1109/IROS.2005.1545443 Publication Year: 2005, pp. 3195-3200.*

Crabot: Educational Robot Prototype for Cleaning; Montufar-Chaveznava, R.; Fernandez, Y.L.; Artificial intelligence, 2005. epia 2005. portuguese conference on; Digital Object Identifier: 10.1109/EPIA.2005.341227; Publication Year: 2005, pp. 266-271.*

A neural network approach to complete coverage path planning; Yang, S.X.; Luo, C.; Systems, Man, and Cybernetics, Part B: Cybernetics, IEEE Transactions on; vol. 34, Issue: 1; Digital Object Identifier: 10.1109/TSMCB.2003.811769 Publication Year: 2004, pp. 718 - 724.*

Real-time area-covering operations with obstacle avoidance for cleaning robots; Chaomin Luo; Yang, S.X.; Xiaobu Yuan; Intelligent Robots and Systems, 2002. IEEE/RSJ International Conference on; vol. 3; Digital Object Identifier: 10.1109/IRDS.2002.1041620; Publication Year: 2002, pp. 2359-2364 vol. 3.*

RCUBE—a platform for intelligent autonomous systems; Boersch, I.; Heinsohn, J.; Loose, H.; Mrkor, K.-U.; Industrial Technology, 2003 IEEE International Conference on; vol. 1; Digital Object Identifier: 10.1109/ICIT.2003.1290269 Publication Year: 2003, pp. 203-206 vol. 1.*

Gaussian interference channels with multiple receive antennas: Capacity and generalized degrees of freedom; I-Hsiang Wang; Tse, D.N.C.; Communication, Control, and Computing, 2008 46th Annual Allerton Conference on; Digital Object Identifier: 10.1109/ALLERTON.2008.4797628; Publication Year: 2008, pp. 715-722.*

Starting and high speed driving of single phase flux reversal motor for vacuum cleaner; Ki-Bong Jang; Tae Heoung Kim; Seung-Bin Lim; Ju Lee; Magnetics Conference, 2005. INTERMAG Asia 2005. Digests of the IEEE International; Digital Object Identifier: 10.1109/INTMAG.2005.1463809; Publication Year: 2005, pp. 761-762.*

Starting and high-speed driving of single-phase flux-reversal motor for vacuum cleaner; Jang, K.B.; Sung Hong Won; Tae Heoung Kim; Ju Lee; Magnetics, IEEE Transactions on; vol. 41, Issue: 10 Digital Object Identifier: 10.1109/TMAG.2005.855181; Publication Year: 2005, pp. 3967-3969.*

Precise Navigation, Guidance and Control Services within the Agricultural Community, The Journal of Navigation, vol. 42, No. 1, pp. 1-10.

Vision-based road-following using a small autonomous aircraft; Frew, E. McGee et al., Center for Collaborative Control of Unmanned Vehicles, California Univ., Berkeley, CA, USA: Aerospace Conference, 2004. Proceedings. 2004 IEEE-Publication Date: Mar. 6-13, 2004, vol. 5, on pp. 3006-3015.

An evidential fusion architecture for advanced driver assistance; Clerentin, A.; Delahoche, L., Marhic, B.; Delafosse, M.; Allart, B.; Intelligent Robots and Systems, 2009, IROS 2009. IEEE/RSJ International Conference on, Oct. 10-15, 2009 pp. 327-332; Digital Object Identifier 10.1109/IROS.2009.5354784.

A multi-level collaborative driving framework for autonomous vehicles; Junqing Wei; Dolan, J.M.; Robot and Human Interactive Communication, 2009. RO-MAN 2009. The 18th IEEE International Symposium on, Sep. 27, 2009-Oct. 2, 2009 pp. 40-45 Digital Identifier 10.1109/ROMAN.2009.5326205.

Navigation and slope detection system design for autonomous mobile robot; Boyu Wei; Junyao Gao; Kejie Li; Hu Chen; Electronic Measurement & Instructions, 2009. ICEMI '09. 9th International Conference on Aug. 16-19, 2009 pp. 4-654-4-658; Digital Object Identifier 10.1109/ICEMI.2009.5274672.

Design of an autonomous mobile robot for hospital; Wang Jia; Wei Bo-yu; Zhang Ye; Chen Hu; IT in Medicine & Education, 2009. ITIME '09. IEEE International Symposium on; vol. 1, Aug. 14-16, 2009 pp. 1181-1186; Digital Object Identifier 10.1109/ITIME.2009.5236275.

GIS map based mobile robot navigation in urban environments; Mirats-Tur, J.M.; Zinggerling, C.: Corominas-Murtra, A.: Advanced Robotics, 2009. ICAR 2009. International Conference on Jun. 22-26, 2009 pp. 1-6.

Robustness analysis of evolutionary controller tuning using real systems; Gongora, M.A.; B.N.; Hopgood, A.A.; Evolutionary Computation, 2009. CEC'09. IEEE Congress on; May 18-21, 2009 pp. 606-613; Digital Object Identifier 10.1109/CEC.2009.4983001.

Low Level Control in a Modular System Architecture for Realizing Precise Driving Maneuvers of the Autonomous Vehicle Caroline; Wille, J.M.; Form, T.; Intelligent Transportation Systems, 2008. ITSC 2008. 11th International IEEE Conference on Oct. 12-15, 2008 pp. 705-710; Digital Object Identifier 10.1109/ITSC.2008.4732583.

Deep belief net learning in a long-range vision system for autonomous off-road driving; Hadsell, R.; Erkan, A.; Sermanet, P.; Scoffier, M.; Muller, U.; Yann LeCun; Intelligent Robots and Systems, 2008. IROS 2008. IEEE/RSJ International Conference on Sep. 22-26, 2008 pp. 628-633; Digital Object identifier 10.1109/IROS.2008.4651217.

U.S. Office Action mailed Nov. 30, 2007 in parent U.S. Appl. No. 11/072,435.

U.S. Office Action mailed Sep. 5, 2008 in parent U.S. Appl. No. 11/072,435.

U.S. Final Office Action mailed Apr. 6, 2009 in parent U.S. Appl. No. 11/072,435.

U.S. Advisory Action mailed Jun. 15, 2009 in parent U.S. Appl. No. 11/072,435.

U.S. Office Action mailed Jul. 22, 2009 in parent U.S. Appl. No. 11/072,435.

U.S. Notice of Allowance mailed Jan. 26, 2010 in parent U.S. Appl. No. 11/072,435.

* cited by examiner

TRAVELING CONTROL METHOD, MEDIUM, AND APPARATUS FOR AUTONOMOUS NAVIGATION

CROSS-REFERENCE TO RELATED APPLICATIONS

This application is a Divisional of application Ser. No. 11/072,435 filed on Mar. 7, 2005 now U.S. Pat. No. 7,734,385, which claims the priority of Korean Patent Application No. 2004-15151, filed on Mar. 5, 2004, in the Korean Intellectual Property Office, the disclosure of which is incorporated herein by reference.

BACKGROUND OF THE INVENTION

1. Field of the Invention

Embodiments of the present invention relate to control of an autonomous navigation machine, and more particularly, to methods, media, and apparatuses for controlling the traveling of an autonomous navigation machine by using a radio frequency identifier.

2. Description of the Related Art

Recently, various autonomous navigation machines including traveling drivers, sensors, traveling controllers, etc., for automatic operation have been developed. For example, cleaning robots travel by themselves, without users' manipulations, and perform cleaning work such as vacuuming dust or foreign substances. The cleaning robots can detect the distances to obstacles such as furniture, office supplies, and walls in the areas to be cleaned by way of sensors, and clean the areas without colliding with the obstacles by using the detected distances.

There are several methods of controlling the traveling of such an autonomous navigation machine. For example, magnetic tape has been used to outline the overall area, as guide lines. When an autonomous navigation machine travels along the guide lines, the autonomous navigation machine must contact the magnetic tape to read out data recorded on the magnetic tape. However, with the passage of time, the magnetic tape may be worn away or broken. As another example, ultrasonic wave transmitters provided at specific areas such as access restriction areas or access permission areas are used. The autonomous navigation machine can discriminate the specific areas by using the ultrasonic waves transmitted from the ultrasonic wave transmitters. However, power sources must be included in the ultrasonic wave transmitters and it is difficult to accurately discriminate the specific areas because the ultrasonic waves may be intercepted by obstacles.

Further, area data recorded to the autonomous navigation machine must also be replaced whenever the autonomous navigation machine travels in access restriction areas, e.g., where an infant, a flowerpot, a work tool, etc., may be placed. Furthermore, when using the magnetic tape or the ultrasonic waves, since a 1:1 command system, such as access restriction or access permission, is employed for areas, it is difficult for the autonomous navigation machine to efficiently perform a plurality of commands in a single area and a user cannot arbitrarily manipulate the traveling control data.

SUMMARY OF THE INVENTION

Embodiments of the present invention provide methods, media, and apparatuses for controlling the traveling of an autonomous navigation machine using a radio frequency identifier.

Additional aspects and/or advantages of the invention will be set forth in part in the description which follows and, in part, will be obvious from the description, or may be learned by practice of the invention.

To achieve the above and/or other aspects and advantages, embodiments of the present invention set forth a traveling control method of controlling an autonomous navigation machine having at least first and second receivers that receive a radio signal transmitted from a transmitter disposed at a specific position in a traveling area, the method including at least one of the first and second receivers receiving the radio signal, recognizing a command included in the received radio signal, and acquiring data indicating a size of a recognizable area corresponding to the radio signal and a position of the transmitter while the autonomous navigation machine moves along a border of the recognizable area. The method may further include executing the recognized command in the recognizable area. Similarly, the method may include modifying map data regarding the traveling area based on the recognized command and the size data of the recognizable area.

In the acquiring of data indicating the size of the recognizable area, the autonomous navigation machine may travel along the border of the recognizable area according to a traveling mode and a turning angle corresponding to whether the radio signal is received by the first and/or second receiver. In addition, the acquiring of the data indicating the size of the recognizable area may further include maintaining a traveling mode to be a straight traveling mode when the radio signal is received by only the first receiver, changing the traveling mode to a left turn mode when the radio signal is received by both the first and second receivers directly after the radio signal is received by only the first receiver, maintaining the traveling mode as the straight traveling mode until the radio signal is not received by either of the first and second receivers directly after turning left a predetermined turning angle, changing the traveling mode to a right turn mode when the radio signal is not received by either of the first and second receivers; and maintaining the traveling mode as the straight traveling mode until the radio signal is received by both the first and second receivers directly after turning right a predetermined turning angle.

The acquiring of data indicating the size of the recognizable area may include maintaining a traveling mode as a straight traveling mode when the radio signal is received by only the second receiver, changing the traveling mode to a right turn mode when the radio signal is received by both the first and second receivers directly after the radio signal is received by only the second receiver, maintaining the traveling mode as the straight traveling mode until the radio signal is not received by either of the first and second receivers directly after turning right a predetermined turning angle, changing the traveling mode to a left turn mode when the radio signal is not received by either of the first and second receivers, and maintaining the traveling mode as the straight traveling mode until the radio signal is received by both the first and second receivers directly after turning left a predetermined turning angle.

The acquiring of data indicating the size of the recognizable area may include changing a traveling mode to a right turn mode when the radio signal is received by both the first and second receivers, maintaining the traveling mode as a straight traveling mode until the radio signal is not received by either of the first and second receivers directly after turning right a predetermined turning angle, changing the traveling mode to a left turn mode when the radio signal is not received by either of the first and second receivers, and maintaining the traveling mode as the straight traveling mode until the radio signal is received by both the first and second receivers directly after turning left a predetermined turning angle.

The turning angle may be defined by $a=k_1(d/tsr)-k_2z$ wherein a is the turning angle, k1 and k2 are constants, d is a distance between the first receiver and the second receiver, t is a time elapsed when changing a present mode to a subsequent mode in a course of changing the traveling mode, s is a speed of the autonomous navigation machine, r is a radius of the recognizable area, and z denotes a recognition state. The recognition state may also be set to 1 when the radio signal is received by both the first and second receivers and is set to 0 when the radio signal is not received by either of the first and second receivers.

To achieve the above and/or other aspects and advantages, embodiments of the present invention set forth a medium including computer readable code implementing embodiments of the present invention.

To achieve the above and/or other aspects and advantages, embodiments of the present invention set forth a traveling control system of an autonomous navigation machine, the system including a transmitting unit disposed at a specific position in a traveling area and transmitting a radio signal, a receiving unit including at least first and second receivers for receiving the radio signal transmitted from the transmitting unit, and a controlling unit that controls a traveling of the autonomous navigation machine such that the autonomous navigation machine travels along a border of a recognizable area according to a traveling mode and a turning angle based on receipt of the radio signal by the first and/or second receivers.

The controlling unit may include a traveling mode and turning angle determining unit that determines the traveling mode and the turning angle corresponding to the received radio signal, a recognition unit that recognizes a command included in the received radio signal, and a traveling control unit that controls the traveling of the autonomous navigation machine such that the autonomous navigation machine travels along the border of the recognizable area according to the traveling mode and the turning angle determined by the traveling mode and turning angle determining unit and executes the recognized command in the recognizable area when the radio signal is received by the first or second receiver.

The traveling mode and turning angle determining unit may set the traveling mode to a straight traveling mode when the radio signal is received by the first receiver, changes the traveling mode to a left turn mode when the radio signal is received by both the first and second receivers, and changes the traveling mode to a right turn when the radio signal is not received by either of the first and second receivers.

The traveling mode and turning angle determining unit may set the traveling mode to a straight traveling mode when the radio signal is received by only the second receiver, changes the traveling mode to a right turn mode when the radio signal is received by both the first and second receivers, and changes the traveling mode to a left turn mode when the radio signal is not received by either of the first and second receivers.

When the traveling mode is changed to the left turn mode or the right turn mode, the turning angle may be defined by $a=k_1(d/tsr)-k_2z$ wherein a is the turning angle, k1 and k2 are constants, d is a distance between the first receiver and the second receiver, t is a time elapsed when changing a present mode to a subsequent mode in a course of changing the traveling mode, s is a speed of the autonomous navigation machine, r is a radius of the recognizable area, and z denotes a recognition state. The recognition state may also be set to 1 when the radio signal is received by both the first and second receivers and is set to 0 when the radio signal is not received by either of the first and second receivers.

When the traveling mode is changed to the left turn mode or the right turn mode, the turning angle may be defined by $a=k_1(d/tsr)-k_2z$ wherein a is the turning angle, $k_1$, and $k_2$ are constants, d is a distance between the first receiver and the second receiver, t is a time elapsed when changing a present mode to a subsequent mode in a course of changing the traveling mode, s is a speed of the autonomous navigation machine, r is a radius of the recognizable area, and z denotes a recognition state.

The traveling control unit may also modify map information on the basis of data regarding the recognizable area.

To achieve the above and/or other aspects and advantages, embodiments of the present invention set forth a navigation apparatus, the apparatus including a receiving unit including at least first and second receivers for receiving a radio signal transmitted from a transmitting unit, and a controlling unit that controls a traveling of the navigation apparatus such that the navigation apparatus travels along a border of a recognizable area according to a traveling mode and a turning angle based on receipt of the radio signal by the first and/or second receivers.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
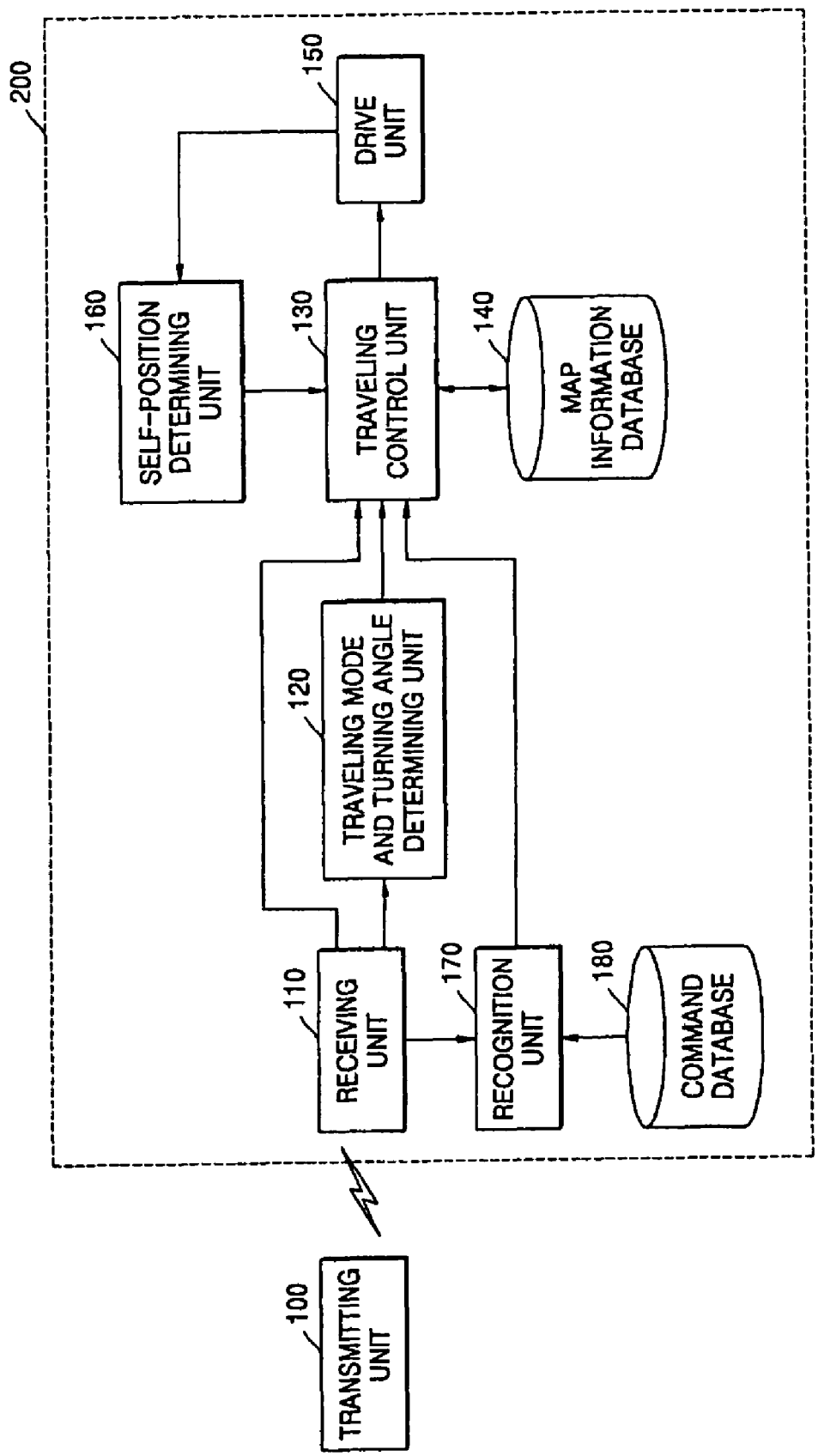
FIG. 1 is a block diagram of a traveling control apparatus of an autonomous navigation machine, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

FIG. 1 is a block diagram of a traveling control apparatus of an autonomous navigation machine, according to an embodiment of the present invention. The traveling control apparatus includes at least a transmitting unit 100 disposed in specific areas, and an autonomous navigation machine 200, including a receiving unit 110, a traveling mode and turning angle determining unit 120, a traveling control unit 130, a map information database 140, a drive unit 150, a self-position determining unit 160, a recognition unit 170, and a command database 180. Here, all or part of the autonomous navigation machine 200 may be integrated within one controlling unit (not shown).

As only an example, referring to FIG. 1, the transmitting unit 100 transmits radio signals, and data corresponding to commands, allocated differently according to features of areas, are included in the radio signals. The transmitting unit 100 can be attached to a fixed structure such as a wall, a fixed object such as furniture, or a mobile object such as an infant's clothing or a work tool. An access restriction area, such as a place where an infant may be placed, an area to be cleaned in detail by the autonomous navigation machine, an area to be cared for intensively, such as a safe, and a docking station for charging can all be set according to the allocated commands.

The receiving unit 110 includes a first receiver R1 disposed on a right side of the autonomous navigation machine and a second receiver R2 disposed on a left side of the autonomous navigation machine. The receiving unit 110 receives the radio signals transmitted from the transmitting unit 100. A signal indicating whether the first and second receivers R1 and R2 of the receiving unit 110 have received radio signals is supplied to the traveling mode and turning angle determining unit 120 and the traveling control unit 130, and the radio signals received by the first and second receivers R1 and R2 are transmitted to the recognition unit 170. The number of the receivers in the receiving unit 110 can vary.

The combination of the transmitting unit 100 and the receiving unit 110 can employ radio frequency identification (RFID) technology, though embodiments of the present invention are not limited to this. When the RFID technology is employed, the transmitting unit 100 and the receiving unit 110 each include an IC chip and an antenna and are used within a range of about 1 m or less, and when a mutual induction method using a coil antenna is employed, a power source required for the operation of the transmitting unit 100 can be supplied by the receiving unit 110. That is, the coil antenna of the receiving unit 110 can generate a strong magnetic field, a part of which causes an inductive voltage in the coil antenna of the transmitting unit 100. The inductive voltage is rectified and used as a power source of the IC chips. The transmitting unit 100 and the receiving unit 110 may process data of a base-band by using several digital encoding methods. The adjustment of load resistance in the coil antenna of the transmitting unit 100 causes a voltage change in the coil antenna, thereby causing amplitude modulation. If the load resistance in the coil antenna of the transmitting unit 100 is controlled according to data corresponding to the commands, the voltage change caused in the coil antenna of the receiving unit 110 corresponds to the controlled load resistance, and thus the commands corresponding to the voltage change can be obtained from the command database 140. The data corresponding to the commands can be arbitrarily set by a user by connecting a data input unit such as a computer, etc. to the transmitting unit 100, similarly to the RFID technology.

The traveling mode and turning angle determining unit 120 determines the traveling mode based on the radio signals received by the first or second receiver $R_1$ and $R_2$ of the receiving unit 110, and determines a turning angle when the traveling mode is a right turn or a left turn. The determined traveling mode and the determined turning angle are transmitted to the traveling control unit 130.

At an initial stage, the traveling control unit 130 controls the drive unit 150 in accordance with map information stored in the map information database 140. When radio signals are received by the first or second receiver $R_1$ or $R_2$ of the receiving unit 110, the traveling control unit 130 controls the drive unit 150 in accordance with the traveling mode and the turning angle received from the traveling mode and turning angle determining unit 120, until the autonomous navigation machine returns to an initial position while traveling in a predetermined recognizable area from the initial position where the radio signals are sensed. After returning to the initial position, a mid-point between the coordinates of the initial position and the coordinates of an outermost position of a traveling path in a recognizable area is determined as a position of the transmitting unit 100, and the size of the recognizable area is determined by a radius obtained from the middle point. The traveling control unit 130 modifies the map information based on the data indicating the position of the transmitting unit 100 and the size of the recognizable area, and the commands supplied from the recognition unit 170, and stores the modified map information in the map information database 140. Then, the traveling control unit 130 executes commands such as access restriction commands or access permission commands included in the radio signals received by the first or second receiver $R_1$ or $R_2$ of the receiving unit 110, for example, access restriction or access permission for the recognizable area. The recognizable area is an area where the radio signals transmitted from the transmitting unit 100 reach, and the size of the area varies according to radio frequencies allocated to the radio signals.

With respect to a traveling area of the autonomous navigation machine, the map information database 140 provides initial feature maps corresponding to kinds of work into a database together with positional coordinates and stores the database. The drive unit 150 moves the autonomous navigation machine in response to the traveling control unit 130. The self-position determining unit 160 executes the ordinary localization, determines a coordinate value of a present position of the autonomous navigation machine by using information obtained from an encoder attached to the drive unit 150 or a natural marker or an artificial marker disposed in a specific position, and transmits the determined coordinate value of the present position to the traveling control unit 130.

The recognition unit 170 analyzes the radio signals received by the first or second receiver $R_1$ or $R_2$ of the receiving unit 110 with reference to the command database 180 and recognizes the commands included in the radio signals. The commands included in the radio signals can be access restriction or access permission commands. The commands recognized by the recognition unit 170 are transmitted to the traveling control unit 130, and are used for modifying the map information and controlling the traveling of the autonomous navigation machine.

The command database 180 matches the commands with the data included in the radio signals, creates a database from the commands, and then stores the database. For example, when data obtained by varying the load resistance of the transmitting unit 100 has three bits '000,' it indicates an access restriction command, '001' may indicate an access permission command, '010' may indicate a detailed work command, and '011' may indicate moving to the docking station for charging.

Figure 2:
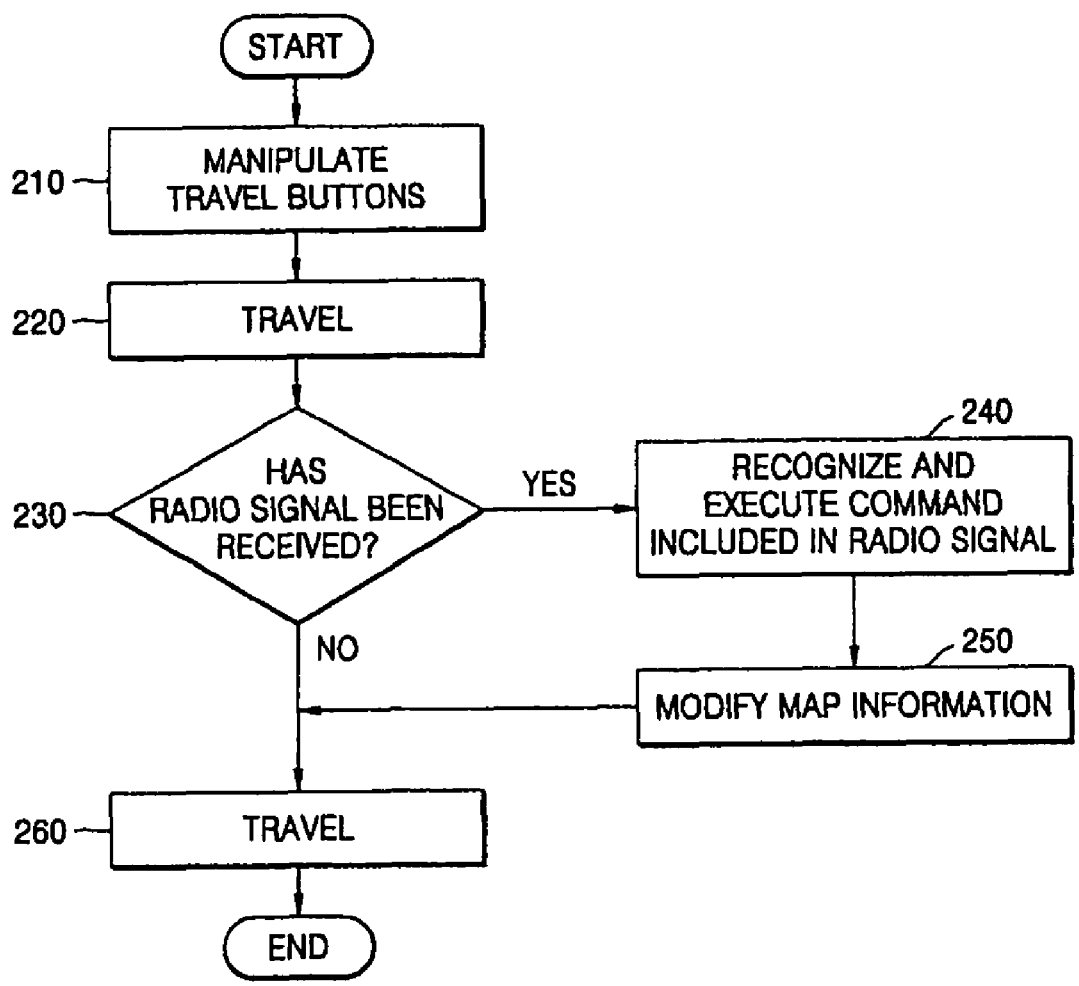
FIG. 2 is a flowchart illustrating a traveling control method of an autonomous navigation machine, according to an embodiment of the present invention.

FIG. 2 is a flowchart illustrating a traveling control method of the autonomous navigation machine according to an embodiment of the present invention. The method will be further explained with reference to FIGS. 1 and 2.

Referring to FIGS. 1 and 2, in operation 210, a traveling command is input to the autonomous navigation machine through manipulation by a user of traveling buttons attached to the autonomous navigation machine, for example. In operation 220, traveling starts in accordance with the map information regarding the traveling area previously stored in the map information database 140.

In operation 230, it is determined whether a radio signal is received by at least one of the first and second receivers $R_1$ and $R_2$, while traveling in accordance with the map information. When it is determined in operation 230 that no radio signal has been received by either of the first and second receivers $R_1$ and $R_2$, traveling continues in accordance with the map information, in operation 260. When it is determined in operation 230 that the radio signal is received by at least one of the first and second receivers $R_1$ and $R_2$, the commands included in the radio signal transmitted from the transmitting unit 100 are recognized and the recognized commands are executed, in operation 240. In order to execute the commands recognized in operation 240 such as access restriction, detailed work commands, etc., first, the information regarding the recognizable area, that is, the information on the size of the area or the position of the transmitting unit 100 is obtained, which will be described later with reference to FIG. 3.

In operation 250, the map information is modified according to new parameters resulting from the execution of the commands in operation 240, and the modified map information is stored in the map information database 140. Then, in operation 260, the traveling continues in accordance with the map information stored in the map information database 140.

Figure 3:
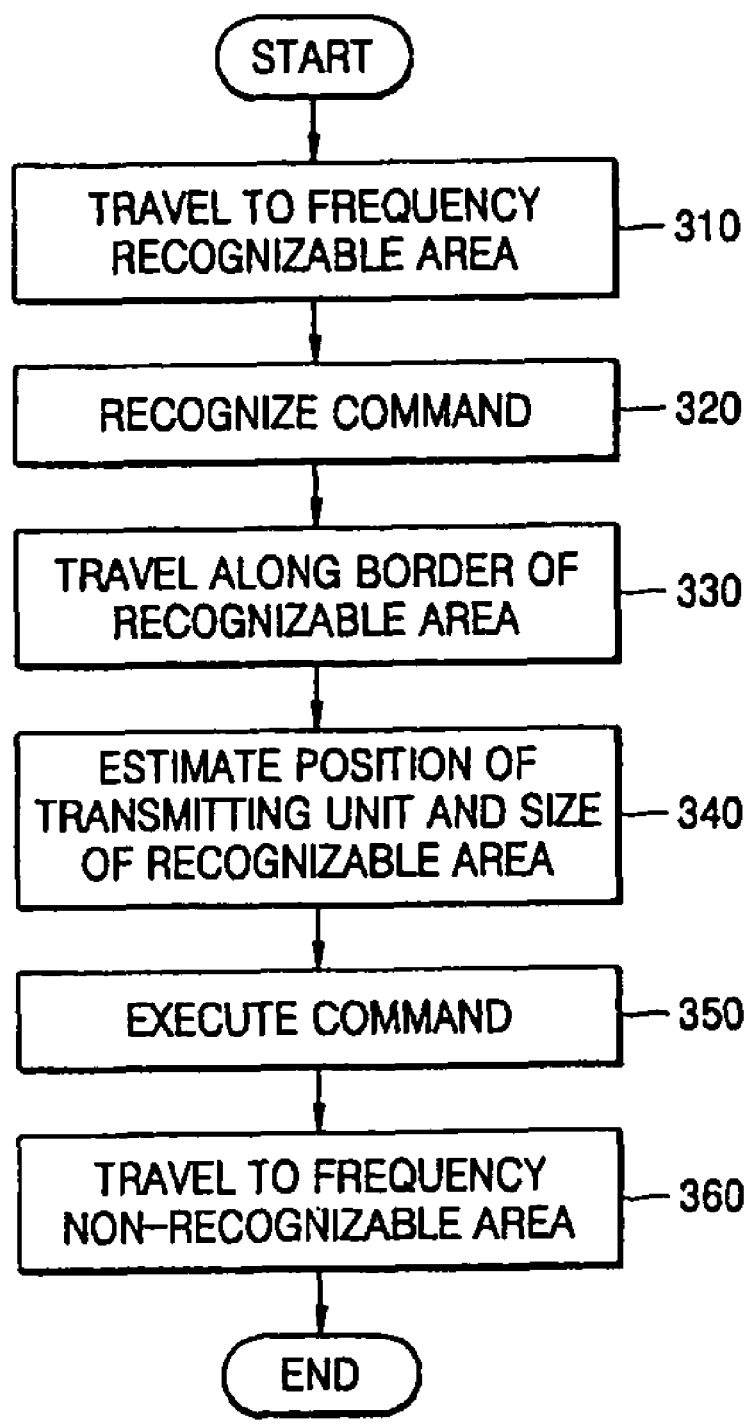
FIG. 3 is a flowchart illustrating in detail operation 240 of FIG. 2, according to an embodiment of the present invention.

FIG. 3 is a flowchart illustrating in detail operation 240 of FIG. 2, according to an embodiment of the present invention.

Referring to FIG. 3, in operation 310, the radio signals are received by the first and/or second receiver $R_1$ or $R_2$ of the receiving unit 110 while the autonomous navigation machine is moving to a frequency recognizable area in the course of traveling according to the map information stored in the map information database 140. In operation 320, the data included in the radio signal received by the first or second receiver $R_1$ or $R_2$ is analyzed, and the commands corresponding to the analyzed data are recognized by referring the command database.

In operation 330, the traveling autonomous navigation machine travels along the border of the recognizable area from an initial position where the first or second receiver $R_1$ or $R_2$ receives the radio signal and returns to the initial position. In operation 340, the position of the transmitting unit 100 and the size, that is, the radius, of the recognizable area, are estimated based on the movement along the border of the recognizable area in operation 330.

In operation 350, the command recognized in operation 320 is executed. As an example, when the command indicates access restriction, operation 360 is performed, that is, the autonomous navigation machine is moved to a frequency non-recognizable area in the course of traveling, in accordance with the map information. As another example, when the command indicates performing detailed work and the autonomous navigation machine is a cleaning robot, the cleaning robot performs the detailed cleaning work by enhancing the cleaning intensity or decreasing the traveling speed, and then operation 360 is performed, that is, the robot is moved to the frequency non-recognizable area in the course of traveling in accordance with the map information. As another example, when the command indicates moving to a docking station for charging, the autonomous navigation machine travels to the position of the transmitting unit 100, performs the charging, and then operation 360 is performed, that is, the autonomous navigation machine moves to the frequency non-recognizable area in the course of traveling in accordance with the map information.

Figure 4A:
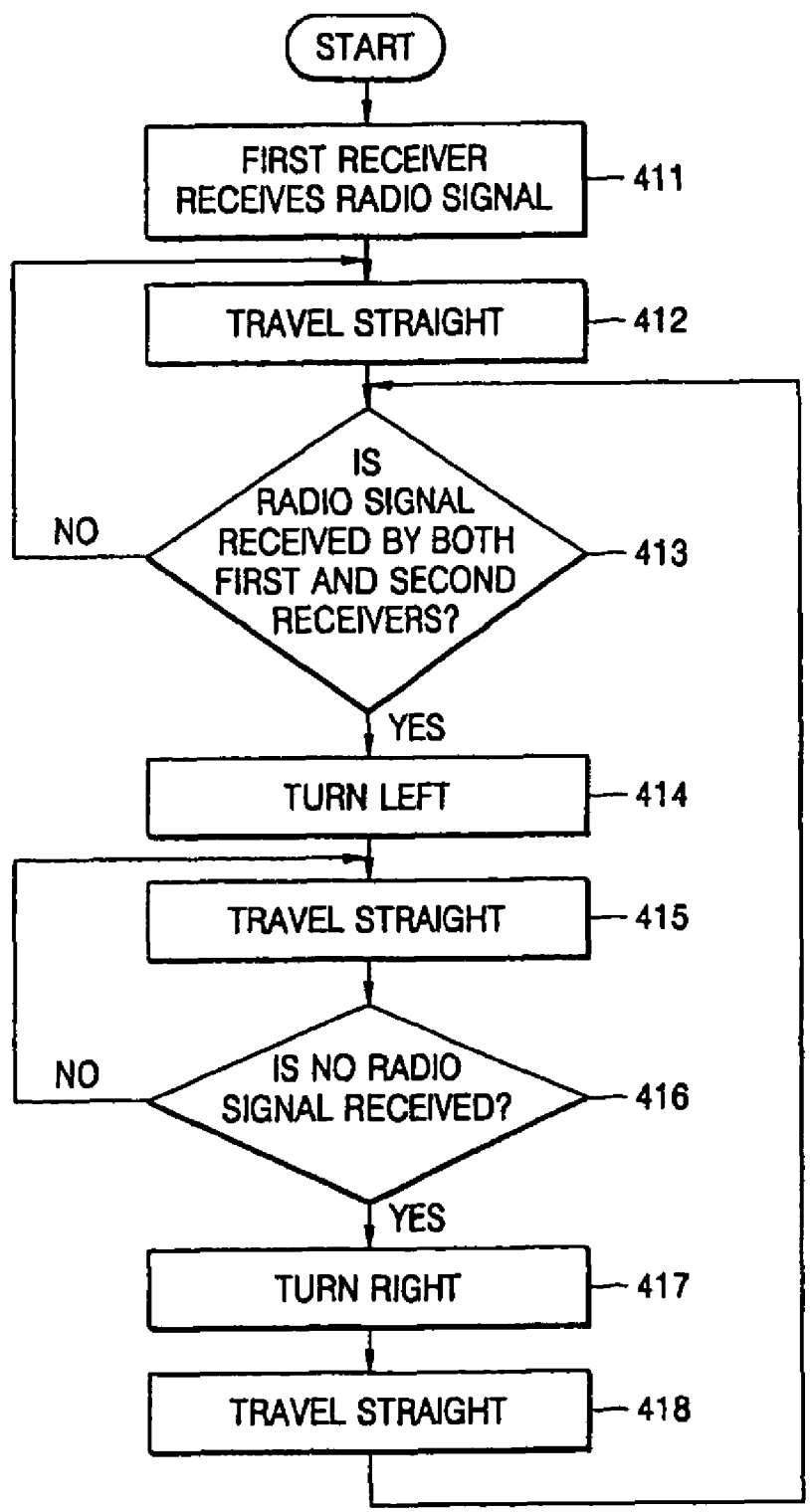
FIGS. 4A to 4C are flowcharts illustrating in detail operation 330 of FIG. 3, according to embodiments of the present invention.
Figure 4B:
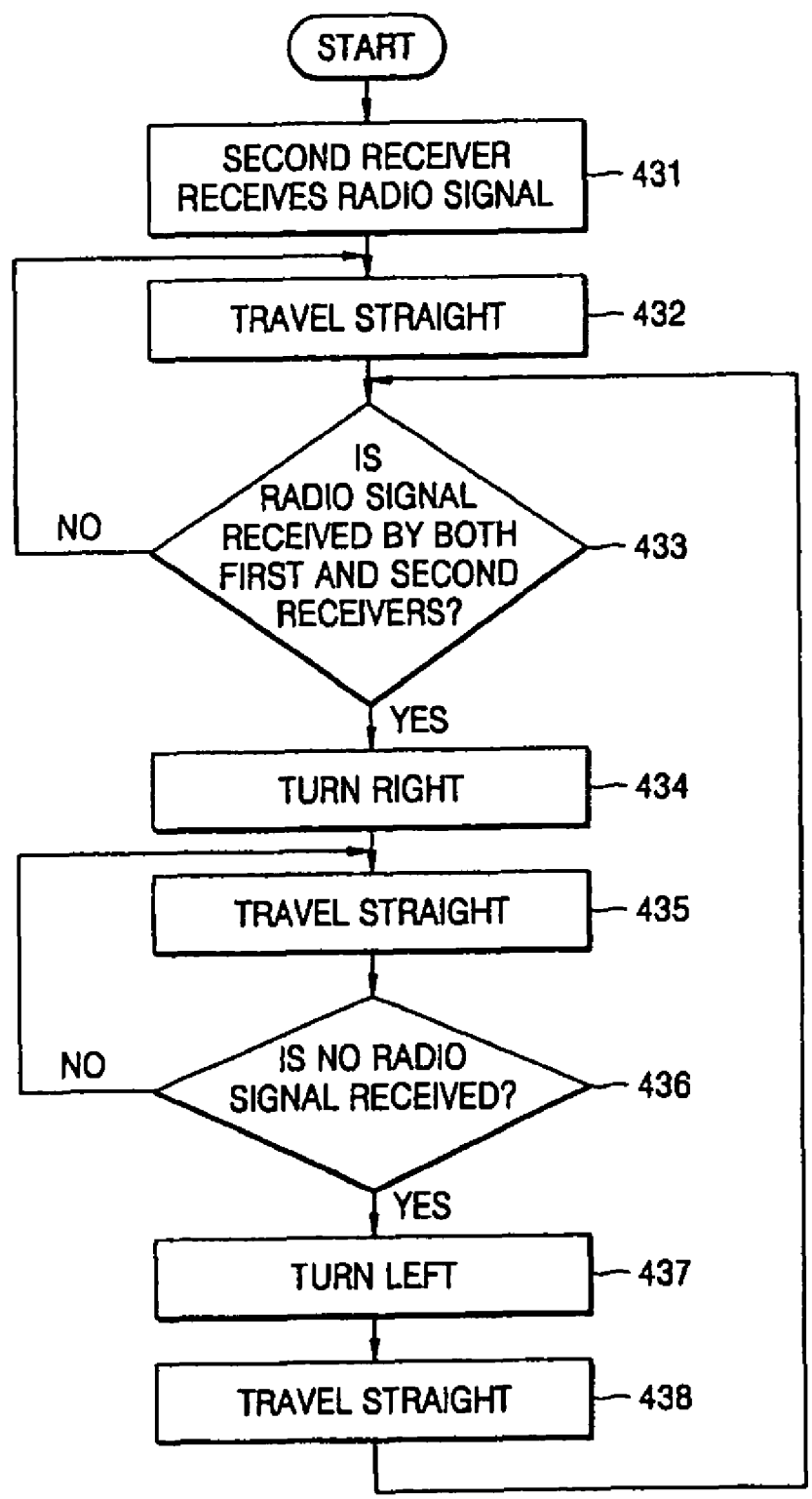
Figure 4C:
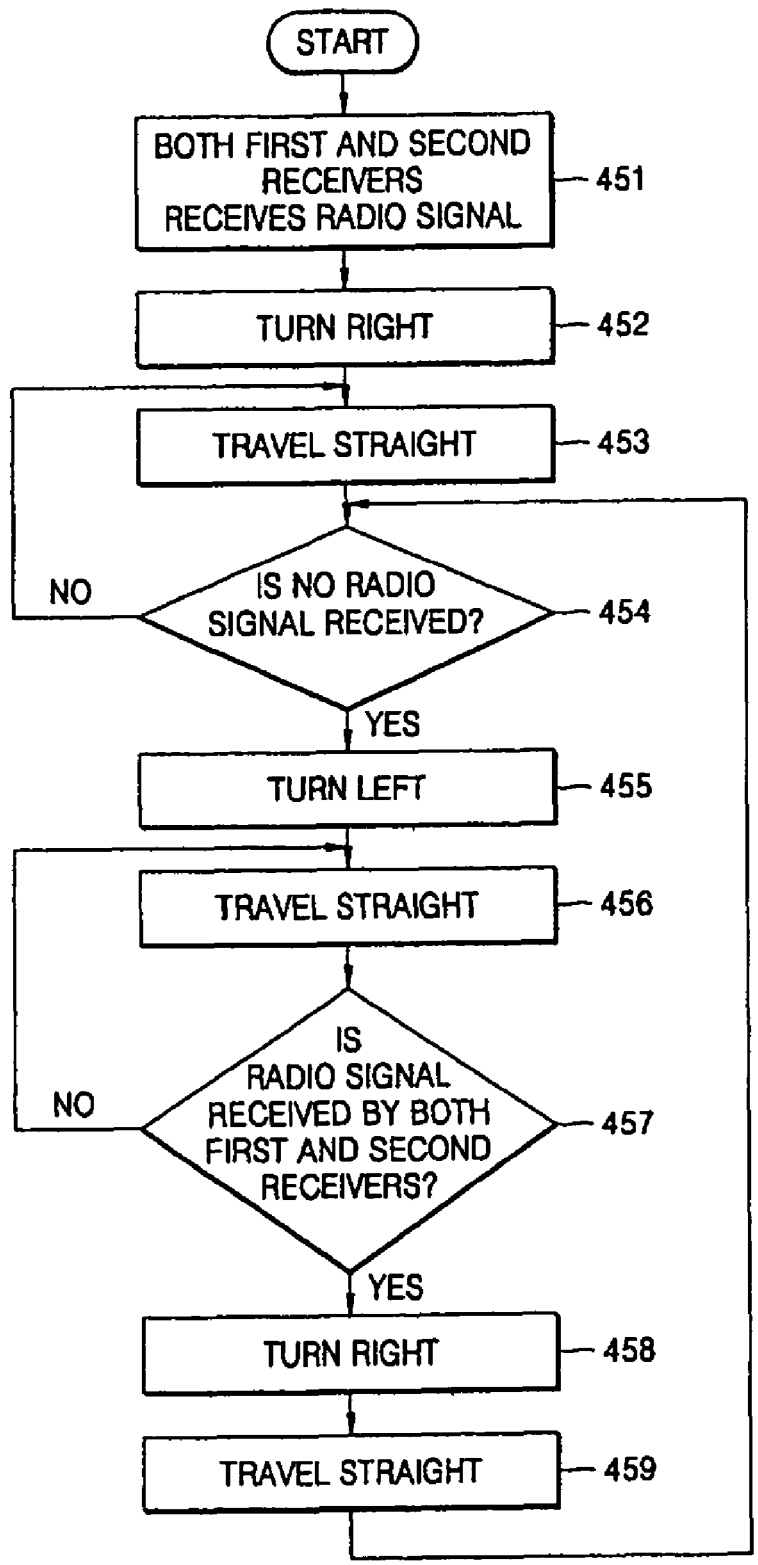

FIGS. 4A to 4C are flowcharts illustrating in detail operation 330 of FIG. 3, according to an embodiment of the present invention. Here, a radio signal receiving mode can be a first mode in which the radio signal is received by the first receiver $R_1$, a second mode in which the radio signal is received by the second receiver $R_2$, a third mode in which the radio signal is received by both the first and second receivers $R_1$ and $R_2$, and a fourth mode in which the radio signal is not received by either of the first and second receivers $R_1$ and $R_2$. The traveling mode may be a straight traveling mode, which may be carried out until the radio signal receiving mode changes from the first or second mode to the third or fourth mode, a left turn mode, which is carried out until the radio signal receiving mode changes from the third mode to the first mode or from the fourth mode to the second mode, and a right turn mode, which is carried out until the radio signal receiving mode changes from the fourth mode to the first mode or from the third mode to the second mode.

First, a case where the radio signal receiving mode is in the first mode, in operation 320, will be explained with reference to FIG. 4A. In operation 411, the radio signal is received by the first receiver $R_1$. In operation 412, the autonomous navigation machine continues traveling straight until the first mode switches to the third mode.

In operation 413, it is determined whether the radio signal receiving mode changes to the third mode. When it is determined that the radio signal receiving mode has changed to the third mode, the autonomous navigation machine turns left a predetermined turning angle until the third mode switches to the first mode (operation 414). Since the radio signal receiving mode changed to the first mode in the left turn, in operation 414, the autonomous navigation machine continues traveling straight until the first mode switches to the fourth mode (operation 415).

In operation 416, it is determined whether the radio signal receiving mode changes to the fourth mode. When it is determined that the radio signal receiving mode has changed to the fourth mode, the autonomous navigation machine turns right a predetermined turning angle until the fourth mode switches to the first mode (operation 417). Since the radio signal receiving mode changes to the first mode in the right turn in operation 417, the autonomous navigation machine continues traveling straight until the first mode switches to the third mode (operation 418).

Next, a case where the radio signal receiving mode is the second mode, in operation 320 will be explained with reference to FIG. 4B. In operation 431, the radio signal is received by the second receiver $R_2$. In operation 432, the autonomous navigation machine continues traveling straight until the second mode switches to the third mode.

In operation 433, it is determined whether the radio signal receiving mode has changed to the third mode. When it is determined that the radio signal receiving mode has changed to the third mode, the autonomous navigation machine turns right a predetermined turning angle until the third mode switches to the second mode (operation 434). Since the radio signal receiving mode has changed to the second mode by the right turn, in operation 434, the autonomous navigation machine continues traveling straight until the second mode switches to the fourth mode (operation 435).

In operation 436, it is determined whether the radio signal receiving mode has changed to the fourth mode. When it is determined that the radio signal receiving mode has changed to the fourth mode, the autonomous navigation machine turns left a predetermined turning angle until the fourth mode switches to the second mode (operation 437). Since the radio signal receiving mode has changed to the second mode by the left turn, in operation 437, the autonomous navigation machine continues traveling straight until the second mode switches to the third mode (operation 438).

Next, a case where the radio signal receiving mode is the third mode, in operation 320, will be explained with reference to FIG. 4C. In operation 451, the radio signal is received by both the first and second receivers $R_1$ and $R_2$. In operation 452, the autonomous navigation machine turns right a predetermined turning angle. Since the radio signal receiving mode changes to the second mode in the right turn, in operation 452, the autonomous navigation machine continues traveling straight until the second mode switches to the fourth mode (operation 453).

In operation a 454, it is determined whether the radio signal receiving mode has changed to the fourth mode. When it is determined that the radio signal receiving mode has changed to the fourth mode, the autonomous navigation machine turns left a predetermined turning angle until the fourth mode switches to the second mode (operation 455). Since the radio signal receiving mode has changed to the second mode by the left turn, in operation 455, the autonomous navigation machine continues traveling straight until the second mode switches to the third mode (operation 456).

In operation 457, it is determined whether the radio signal receiving mode has changed to the third mode. When it is determined that the radio signal receiving mode has changed to the third mode, the autonomous navigation machine turns right a predetermined turning angle until the third mode switches to the second mode (operation 458). Since the radio signal receiving mode has changed to the second mode by the right turn, in operation 458, the autonomous navigation machine continues traveling straight until the second mode switches to the fourth mode (operation 459).

In FIG. 4C, if a left turn by the predetermined turning angle is performed in operation 452, operations 455 and 458 can be changed to a right turn and a left turn, respectively.

Referring to FIGS. 4A to 4C, and according to embodiments of the present invention, the switch of traveling modes can be summarized as follows. When the radio signal is not received by either of the first and second receivers $R_1$ and $R_2$, after the radio signal has been received by the first receiver R1, the autonomous navigation machine can be understood to be outside of the recognizable area, and the traveling mode is changed to the right turn mode. On the other hand, when the radio signal is received by both the first and second receivers $R_1$ and $R_2$, after the radio signal has been received by the first receiver $R_1$, the autonomous navigation machine can be understood to be in the recognizable area, and the traveling mode is changed to the left turn mode. When the radio signal is not received by either of the first and second receivers $R_1$ and $R_2$, after the radio signal was received by the second receiver $R_2$, the autonomous navigation machine can be understood to be out of the recognizable area, and the traveling mode is changed to the left turn mode. When the radio signal is received by both the first and second receivers $R_1$ and $R_2$, after the radio signal has been received by the second receiver $R_2$, the autonomous navigation machine can be understood to be in the recognizable area, and the traveling mode is changed to the right turn mode. When the radio signal is received by both the first and second receivers $R_1$ and $R_2$, after the radio signal was not received by either of the first and second receivers $R_1$ and $R_2$, the traveling mode is changed to any one of the right turn mode and the left turn mode. When the radio signal is received by the first receiver $R_1$ or the second receiver $R_2$ during the traveling, or when the radio signal is received by the first receiver $R_1$ or the second receiver $R_2$ after the traveling mode has been changed to the right turn mode or the left turn mode, straight traveling is carried out.

When the traveling mode is changed to the left turn mode or the right turn mode, a turning angle a can be determined from the following equation:

$$a = k_1(d/tsr) - k_2 z$$

wherein $k_1$ and $k_2$ are constants, d is a distance between the first receiver and the second receiver, t is a time elapsed when changing a present mode to a subsequent mode in the course of changing the traveling modes, s is a speed of the autonomous navigation machine, r is a radius of the recognizable area, and z denotes a recognition state, which can be set to 1 when the radio signal is received by both the first and second receivers and is set to 0 when the radio signal is not received by either of the first and second receivers.

Figure 5:
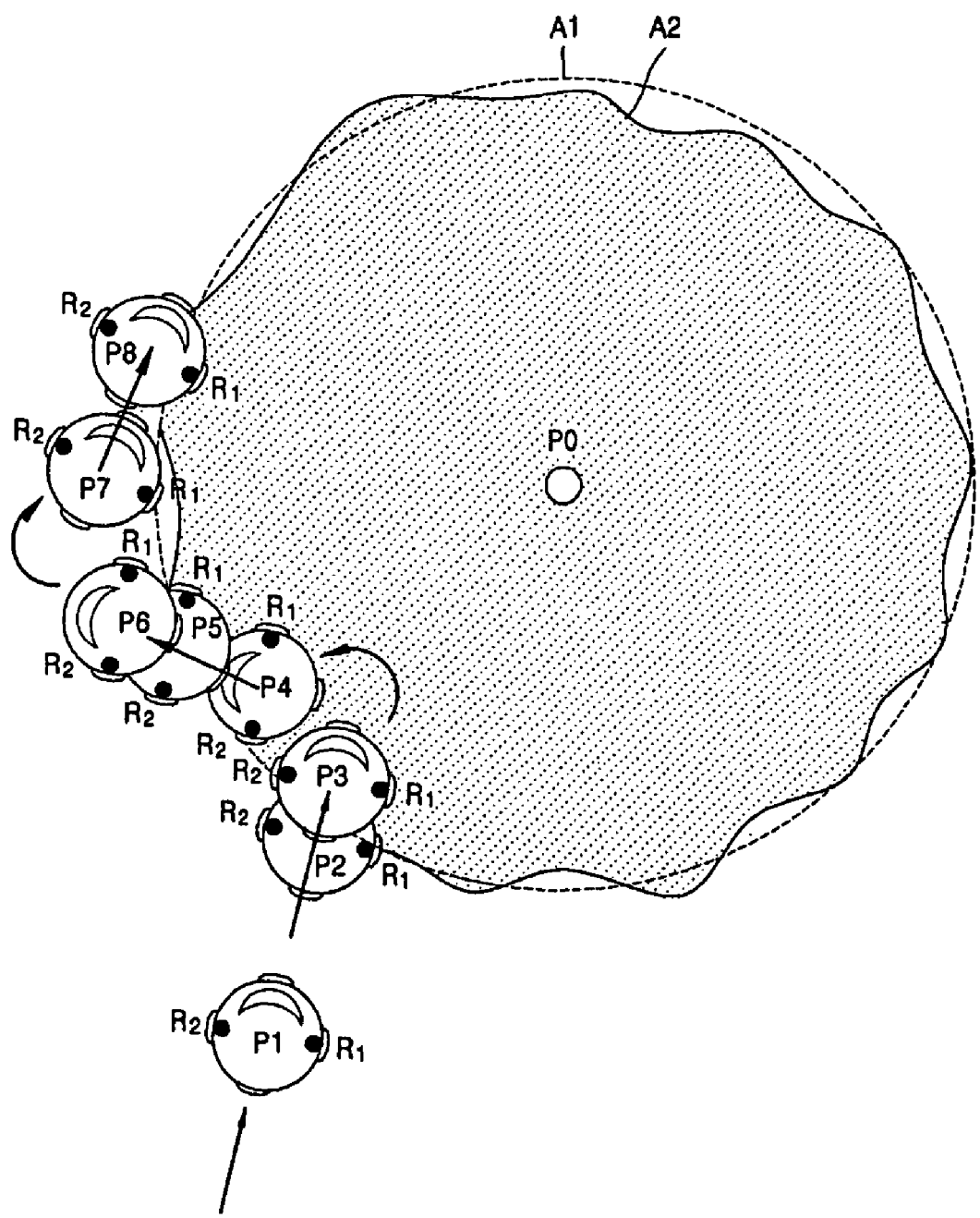
FIG. 5 is a diagram illustrating a traveling path of an autonomous navigation machine employing a traveling control method, according to an embodiment of the present invention.

FIG. 5 is a diagram illustrating a traveling path of the autonomous navigation machine employing the traveling control method, according to an embodiment of the present invention, where a position P0 is an access restriction area to which a radio frequency identifier is attached, area A1 is an ideal recognizable area, and area A2 is an actual recognizable area.

Referring to FIG. 5, at the position P1, the autonomous navigation machine travels using the predetermined map information because the radio signal is not received by either of the first and second receivers $R_1$ and $R_2$. At position P2, the radio signal is received by the first receiver $R_1$ so the autonomous navigation machine travels straight. At position P3, the radio signal is received by both the first and second receivers $R_1$ and $R_2$ while traveling straight so the autonomous navigation machine turns left a predetermined turning angle and travels straight to position P6 via position P4 and position P5. At the position P6, since the radio signal is not received by either of the first and second receivers $R_1$, $R_2$, the autonomous navigation machine turns right a predetermined turning angle and travels straight via position P7 and position P8, until the radio signal is again received by both the first and second receivers $R_1$ and $R_2$.

In this manner, since the autonomous navigation machine can travel along a perimeter of the actual recognizable area A2, which is similar the ideal recognizable area A1, it becomes possible to estimate the size of the recognizable area and to determine the position of the transmitting unit 100 positioned at the center of the recognizable area.

When the command included in the radio signal indicates an access restriction, the autonomous navigation machine can carry out a given task without approaching a corresponding fixed access restriction area or a movable access restriction area. That is, a fixed access restriction area such as furniture can be sensed without the need of a particular obstacle detection sensor. Furthermore, by attaching the radio frequency identifier to an infant, to set the area surrounding the infant as a mobile access restriction area, it is possible to protect the mobile infant from the autonomous navigation machine.

Embodiments of the present invention can also be embodied as computer readable codes in a medium, e.g., on a computer readable recording medium. The medium can be any data storage/transfer device that can store/transfer data which can be thereafter read by a computer system. Examples of the media include read-only memory (ROM), random-access memory (RAM), CD-ROMs, magnetic tapes, floppy disks, optical data storage devices, for example. The medium can also be a distributed network coupled computer system so that the computer readable code is stored/transferred and executed in a distributed fashion. Also, stored/transferred and executed in a distributed fashion. Also, functional programs, codes, and code segments for accomplishing the present invention can be easily construed by programmers skilled in the art to which the present invention pertains.

As described above, according to embodiments of the present invention, by allocating different frequencies to respective radio identifiers attached to specific areas, such as movable access restriction areas or cleaning areas and as fixed access restriction areas, it is possible to effectively receive area data in a wireless manner, and by establishing different commands to the same area, it is also possible to send one of an access permission command and an access restriction command to the traveling machine. Further, since the radio identifiers can transmit data without additional power sources and are semi-permanent and unaffected by a change of environment, it is possible to use the radio identifiers anywhere. Furthermore, since the radio signals are semi-permeable, areas can be selected independent of obstacles, and since a user can intuitionally give a command, it is possible to accomplish a user's required task.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A traveling control method of controlling an autonomous navigation machine having at least first and second receivers that receive a radio signal transmitted from a transmitter disposed at a specific position in a traveling area, the method comprising:
    receiving the radio signal with at least one of the first and second receivers both configured to receive the radio signal;
    recognizing a command included in the received radio signal; and
    acquiring data indicating a size of a recognizable area corresponding to the radio signal and a position of the transmitter while the autonomous navigation machine moves along a border of the recognizable area,
    wherein the autonomous navigation machine travels along the border of the recognizable area according to a traveling mode and a turning angle that are determined based on a determination of whether the first receiver receives the radio signal and whether the second receiver receives the radio signal, such that when the radio signal is received the traveling mode and the turning angle are determined based on whether the radio signal is received by both of the first and second receivers or received by only one of the first and second receivers.

2. The traveling control method according to claim 1, further comprising:
    executing the recognized command in the recognizable area.

3. The traveling control method according to claim 1, further comprising modifying map data regarding the traveling area based on the recognized command and the size data of the recognizable area.

4. A navigation apparatus, the apparatus comprising:
    a receiving unit including at least first and second receivers both configured to receive a radio signal transmitted from a transmitting unit; and
    a controlling unit that controls a traveling of the navigation apparatus such that the navigation apparatus travels along a border of a recognizable area according to a traveling mode and a turning angle based on a determination of whether the first receiver receives the radio signal and whether the second receiver receives the radio signal, such that when the radio signal is received the traveling mode and the turning angle are determined based on whether the radio signal is received by both of the first and second receivers or received by only one of the first and second receivers.

5. The traveling control method according to claim 1, wherein the acquiring of the data indicating the size of the recognizable area further comprises:
    maintaining a traveling mode to be a straight traveling mode when the radio signal is received by only the first receiver;
    changing the traveling mode to a left turn mode when the radio signal is received by both the first and second receivers directly after the radio signal is received by only the first receiver;
    maintaining the traveling mode as the straight traveling mode until the radio signal is not received by either of the first and second receivers directly after turning left a predetermined turning angle;
    changing the traveling mode to a right turn mode when the radio signal is not received by either of the first and second receivers; and
    maintaining the traveling mode as the straight traveling mode until the radio signal is received by both the first and second receivers directly after turning right a predetermined turning angle.

6. The traveling control method according to claim 1, wherein the acquiring of data indicating the size of the recognizable area further comprises:
    maintaining a traveling mode as a straight traveling mode when the radio signal is received by only the second receiver;
    changing the traveling mode to a right turn mode when the radio signal is received by both the first and second receivers directly after the radio signal is received by only the second receiver;
    maintaining the traveling mode as the straight traveling mode until the radio signal is not received by either of the first and second receivers directly after turning right a predetermined turning angle;
    changing the traveling mode to a left turn mode when the radio signal is not received by either of the first and second receivers; and
    maintaining the traveling mode as the straight traveling mode until the radio signal is received by both the first and second receivers directly after turning left a predetermined turning angle.

7. The traveling control method according to claim 1, wherein the acquiring of data indicating the size of the recognizable area further comprises:
    changing a traveling mode to a right turn mode when the radio signal is received by both the first and second receivers;
    maintaining the traveling mode as a straight traveling mode until the radio signal is not received by either of the first and second receivers directly after turning right a predetermined turning angle;
    changing the traveling mode to a left turn mode when the radio signal is not received by either of the first and second receivers; and
    maintaining the traveling mode as the straight traveling mode until the radio signal is received by both the first and second receivers directly after turning left a predetermined turning angle.

8. The traveling control method according to claim 1, wherein the turning angle is defined by $$a = k_1(d/tsr) - k_2 z$$

wherein a is the turning angle, k1 and k2 are constants, d is a distance between the first receiver and the second receiver, t is a time elapsed when changing a present mode to a subsequent mode in a course of changing the traveling mode, s is a speed of the autonomous navigation machine, r is a radius of the recognizable area, and z denotes a recognition state.

9. The traveling control method according to claim 8, wherein the recognition state is set to 1 when the radio signal is received by both the first and second receivers and is set to 0 when the radio signal is not received by either of the first and second receivers.

10. A non-transitory computer readable recording medium comprising computer readable code to control at least one processing device to implement the method of claim 1.

11. The medium of claim 10, wherein the method further comprises:
    executing the recognized command in the recognizable area.

12. The navigation apparatus according to claim 4, wherein the navigation apparatus is an autonomous navigation apparatus.

13. The navigation apparatus according to claim 4, wherein the controlling unit further executes a command included in the radio signal.

14. The navigation apparatus according to claim 4, wherein the controlling unit comprises:
    a traveling mode and turning angle determining unit that determines the traveling mode and the turning angle corresponding to the received radio signal;
    a recognition unit that recognizes a command included in the received radio signal; and
    a traveling control unit that controls the traveling of the navigation apparatus such that the navigation apparatus travels along the border of the recognizable area according to the traveling mode and the turning angle determined by the traveling mode and turning angle determining unit and executes the recognized command in the recognizable area when the radio signal is received by the first or second receiver.

15. The navigation apparatus according to claim 14, wherein the traveling mode and turning angle determining unit sets the traveling mode to a straight traveling mode when the radio signal is received by the first receiver, changes the traveling mode to a left turn mode when the radio signal is received by both the first and second receivers, and changes the traveling mode to a right turn when the radio signal is not received by either of the first and second receivers.

16. The navigation apparatus according to claim 14, wherein the traveling mode and turning angle determining unit sets the traveling mode to a straight traveling mode when the radio signal is received by only the second receiver, changes the traveling mode to a right turn mode when the radio signal is received by both the first and second receivers, and changes the traveling mode to a left turn mode when the radio signal is not received by either of the first and second receivers.

17. The navigation apparatus according to claim 15, wherein when the traveling mode is changed to the left turn mode or the right turn mode, the turning angle is defined by $$a = k_1(d/tsr) - k_2 z$$

wherein a is the turning angle, k1 and k2 are constants, d is a distance between the first receiver and the second receiver, t is a time elapsed when changing a present mode to a subsequent mode in a course of changing the traveling mode, s is a speed of the navigation apparatus, r is a radius of the recognizable area, and z denotes a recognition state.

18. The navigation apparatus according to claim 17, wherein the recognition state is set to 1 when the radio signal is received by both the first and second receivers and is set to 0 when the radio signal is not received by either of the first and second receivers.

19. The navigation apparatus according to claim 16, wherein when the traveling mode is changed to the left turn mode or the right turn mode, the turning angle is defined by $$a = k_1(d/tsr) - k_2 z$$

wherein a is the turning angle, $k_1$ and $k_2$ are constants, d is a distance between the first receiver and the second receiver, t is a time elapsed when changing a present mode to a subsequent mode in a course of changing the traveling mode, s is a speed of the navigation apparatus, r is a radius of the recognizable area, and z denotes a recognition state.

20. The navigation apparatus according to claim 19, wherein the recognition state is set to 1 when the radio signal is received by both the first and second receivers and is set to 0 when the radio signal is not received by either of the first and second receivers.

21. The navigation apparatus according to claim 4, wherein the traveling control unit modifies map information on the basis of data regarding the recognizable area.

* * * * *

UNITED STATES PATENT AND TRADEMARK OFFICE
CERTIFICATE OF CORRECTION

PATENT NO. : 8,255,107 B2
APPLICATION NO. : 12/662587
DATED : August 28, 2012
INVENTOR(S) : Gyunghye Yang et al.

It is certified that error appears in the above-identified patent and that said Letters Patent is hereby corrected as shown below:

Title Page, Column 2 (Other Publications); Line 1; Delete "al..," and insert -- al., --, therefor.
Title Page, Column 2 (Other Publications); Line 2-5; Delete "Yagi....914." and insert the same after 634-648." on First Page, Col. 2, Line 3 as a new entry.
Title Page, Column 2 (Other Publications); Line 4; Delete "usign" and insert -- using --, therefor.

In the Claims
Column 13; Line 4 (Approx.); In Claim 8, delete "k1" and insert -- $k_1$ --, therefor.
Column 13; Line 4 (Approx.); In Claim 8, delete "k2" and insert -- $k_2$ --, therefor.
Column 14; Line 16 (Approx.); In Claim 17, delete "k1" and insert -- $k_1$ --, therefor.
Column 14; Line 16 (Approx.); In Claim 17, delete "k2" and insert -- $k_2$ --, therefor.

Signed and Sealed this
Fourteenth Day of May, 2013

Teresa Stanek Rea
*Acting Director of the United States Patent and Trademark Office*